(12) United States Patent
Ukegawa

(10) Patent No.: US 10,055,179 B2
(45) Date of Patent: Aug. 21, 2018

(54) INFORMATION PROCESSING DEVICE, INFORMATION PROCESSING METHOD, AND NON-TRANSITORY COMPUTER PROGRAM PRODUCT

(71) Applicant: Junji Ukegawa, Kanagawa (JP)

(72) Inventor: Junji Ukegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/494,693

(22) Filed: Apr. 24, 2017

(65) Prior Publication Data

US 2017/0337019 A1 Nov. 23, 2017

(30) Foreign Application Priority Data

May 17, 2016 (JP) .................................. 2016-098571
Sep. 16, 2016 (JP) .................................. 2016-182082

(51) Int. Cl.
*G06F 15/00* (2006.01)
*G06F 3/12* (2006.01)

(52) U.S. Cl.
CPC ............ *G06F 3/1225* (2013.01); *G06F 3/123* (2013.01); *G06F 3/1204* (2013.01); *G06F 3/1222* (2013.01); *G06F 3/1238* (2013.01); *G06F 3/1286* (2013.01); *G06F 3/1287* (2013.01)

(58) Field of Classification Search
CPC .... G06F 3/1225; G06F 3/1204; G06F 3/1222; G06F 3/1286
USPC ......................................................... 358/1.15
See application file for complete search history.

(56) References Cited

U.S. PATENT DOCUMENTS

| 8,817,279 B2 | 8/2014 | Osawa | |
|---|---|---|---|
| 2016/0034264 A1* | 2/2016 | Hayashi | G06F 8/61 717/178 |
| 2016/0337534 A1* | 11/2016 | Kano | H04N 1/00344 |

FOREIGN PATENT DOCUMENTS

| JP | 2012-018530 | 1/2012 |
|---|---|---|
| JP | 2012-048464 | 3/2012 |

* cited by examiner

*Primary Examiner* — Saeid Ebrahimi Dehkordy
(74) *Attorney, Agent, or Firm* — IPUSA, PLLC

(57) ABSTRACT

There is provided a device including an installer configured to install a program in the device, the program belonging to one or more classes of a plurality of classes of functions, and a determining unit configured to determine, for a specific class to which a specific program to be installed belongs, whether a number of programs available in the device reaches an upper limit number corresponding to the specific class in a storage unit configured to store, for each class, an upper limit number of programs to be available, wherein the installer is configured to vary a process related to installation of the specific program depending on a determination result by the determining unit.

18 Claims, 15 Drawing Sheets

FIG.7

| FUNCTION TYPE NAME | UPPER LIMIT NUMBER | INSTALLATION STATUS ||||||
|---|---|---|---|---|---|---|---|
| | | APPLICATION 1 | APPLICATION 2 | APPLICATION 3 | APPLICATION 4 | APPLICATION 5 | APPLICATION 6 |
| AUTHENTICATION | 1 | App8 | | | | | |
| SCAN | 4 | App1 | App2 | App3 | App6 | | |
| FACSIMILE TRANSMISSION | 2 | App2 | | | | | |
| FACSIMILE RECEPTION | 1 | App2 | | | | | |
| PRINT | 6 | App1 | App2 | App3 | App4 | App5 | |
| DISTRIBUTION | 4 | App1 | App3 | | | | |
| ACCUMULATION | 3 | App4 | | | | | |
| TRACKING | 1 | App1 | | | | | |
| OCR | 0 | | | | | | |
| DEVICE ADDRESS BOOK REFERENCING | 5 | App1 | App2 | App3 | | | |
| DEVICE ADDRESS BOOK WRITING | 1 | App1 | | | | | |

131

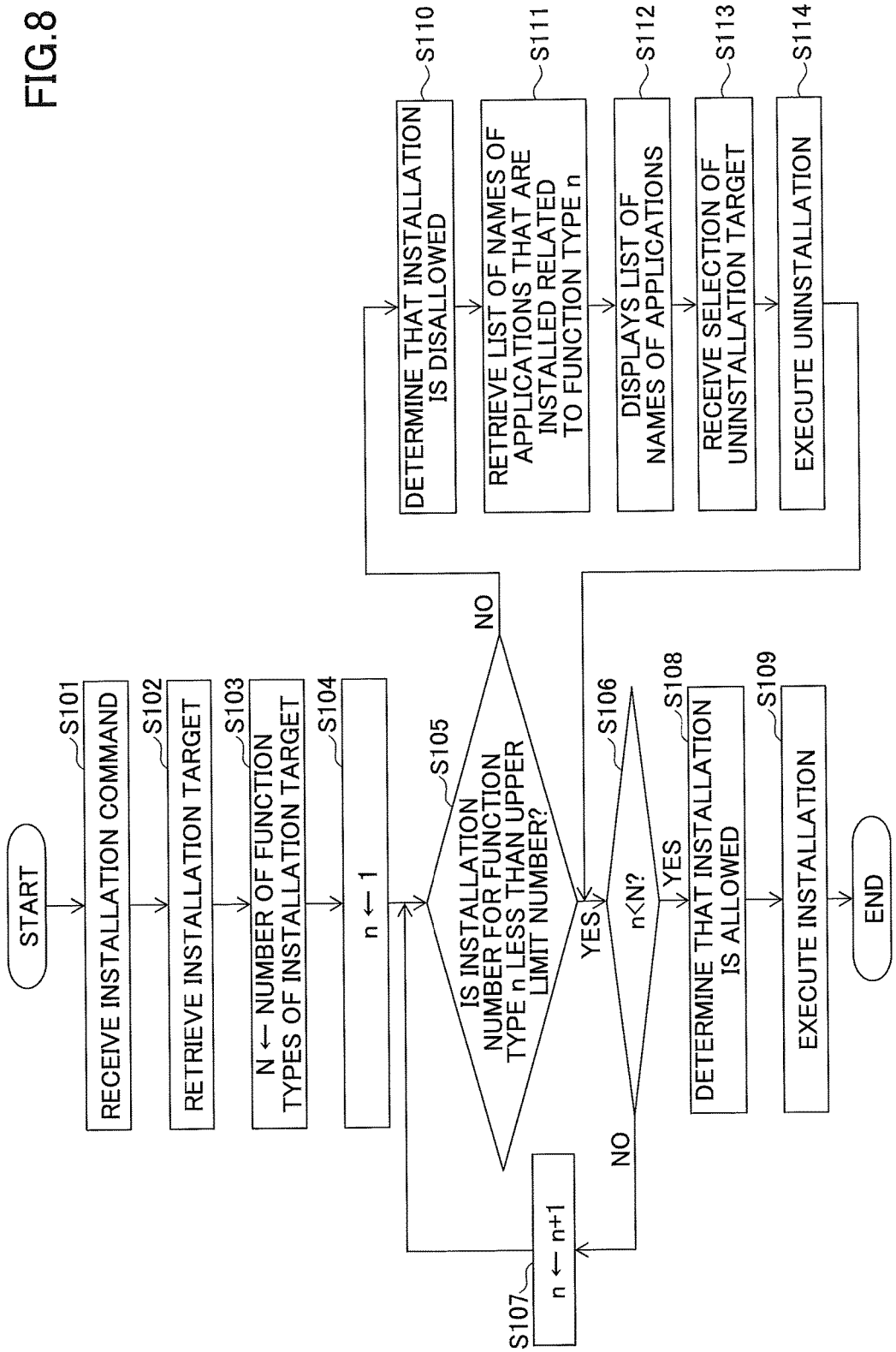

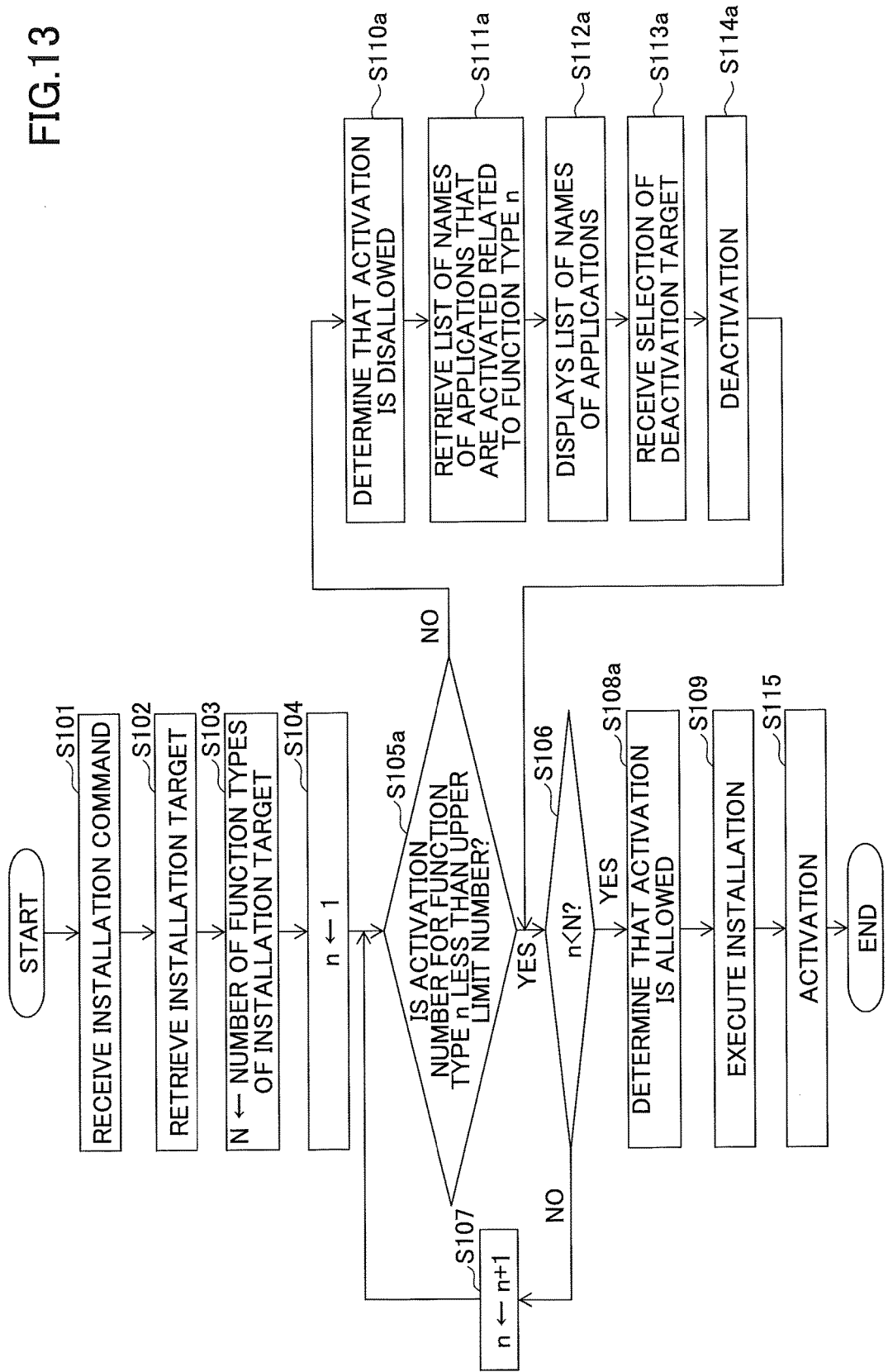

FIG.14

| FUNCTION TYPE NAME | UPPER LIMIT NUMBER | ACTIVATION STATUS 132 | | | | | |
|---|---|---|---|---|---|---|---|
| | | APPLICATION 1 | APPLICATION 2 | APPLICATION 3 | APPLICATION 4 | APPLICATION 5 | APPLICATION 6 |
| AUTHENTICATION | 1 | App8 | | | | | |
| SCAN | 4 | App1 | App2 | App3 | App6 | | |
| FACSIMILE TRANSMISSION | 2 | App2 | | | | | |
| FACSIMILE RECEPTION | 1 | App2 | | | | | |
| PRINT | 6 | App1 | App2 | App3 | App4 | App5 | |
| DISTRIBUTION | 4 | App1 | App3 | | | | |
| ACCUMULATION | 3 | App4 | | | | | |
| TRACKING | 1 | App1 | | | | | |
| OCR | 0 | | | | | | |
| DEVICE ADDRESS BOOK REFERENCING | 5 | App1 | App2 | App3 | | | |
| DEVICE ADDRESS BOOK WRITING | 1 | App1 | | | | | |

INFORMATION PROCESSING DEVICE, INFORMATION PROCESSING METHOD, AND NON-TRANSITORY COMPUTER PROGRAM PRODUCT

BACKGROUND OF THE INVENTION

1. Field of the Invention

The present disclosure relates to an information processing device, an information processing method, and a non-transitory computer program product 2. Description of the Related Art As for various types of devices, such as an image forming apparatus, convenience can be enhanced by optionally installing or updating an application program, etc., (which is referred to as the "application," hereinafter) in such devices.

For similar functions or services, a plurality of types of applications may be provided. For example, with regard to an image forming apparatus, a plurality of types of applications may be provided for a printing function. Namely, as examples of applications related to the printing function, there may be, in addition to a normal printing application, a simple printing application that can assign only necessary functions for each user; a security enhanced printing application that can only print one's own job in response to an IC card being placed in close proximity, and so forth. A user can select, from a plurality of types of applications, an application that matches own needs, policies, etc.; and the user can install the selected application.

If a large number of applications related to similar functions is installed in one device, each user sharing the one device may be confused as to which application is to be used.

There is a need for a device that can prevent a user from being confused by presence of a large number of available programs.

SUMMARY OF THE INVENTION

According to an aspect of the present disclosure, there is provided a device including an installer that installs a program in the device, the program belonging to one or more classes of a plurality of classes of functions; and a determining unit that determines, for a specific class to which a specific program to be installed belongs, whether a number of programs available in the device reaches an upper limit number corresponding to the specific class in a storage unit that stores, for each class, an upper limit number programs to be available, wherein the installer varies a process related to installation of the specific program depending on a determination result by the determining unit.

Other objects, features and advantages of the present invention will become more apparent from the following detailed description when read in conjunction with the accompanying drawings.

BRIEF DESCRIPTION OF THE DRAWINGS

FIG. 7 is a diagram illustrating an example of a configuration of an installation information storage unit;

FIG. 8 is a flowchart illustrating an example of a procedure to be executed by the image forming apparatus according to another embodiment;

FIG. 13 is a flowchart illustrating an example of a procedure to be executed by the image forming apparatus according to the other embodiment;

FIG. 14 is a diagram illustrating an example of a configuration of an activation information storage unit.

DETAILED DESCRIPTION OF THE PREFERRED EMBODIMENTS

Figure 1:
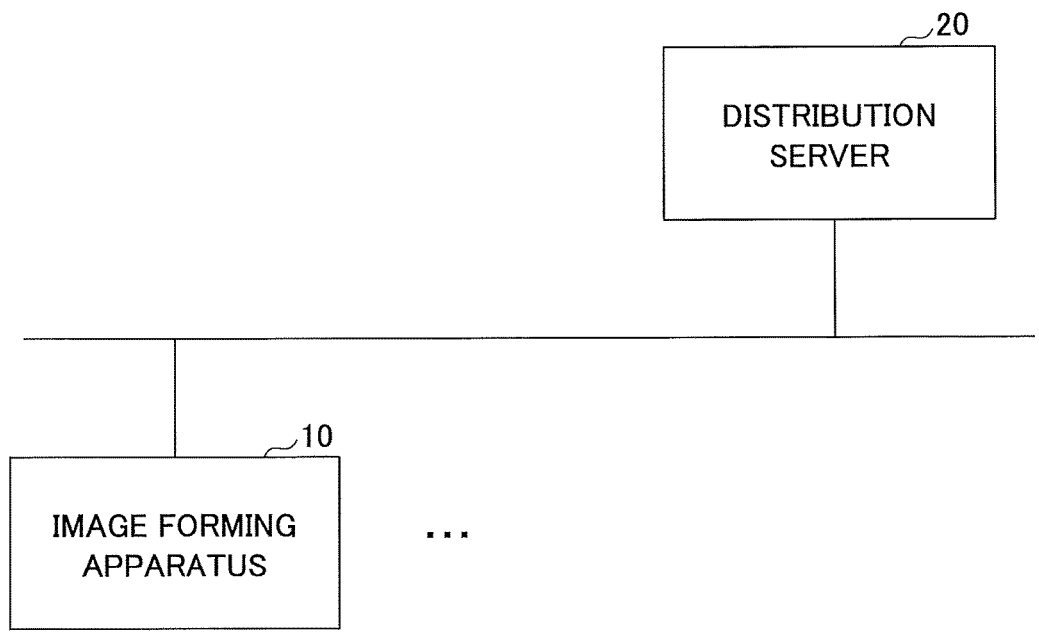
FIG. 1 is a diagram illustrating an example of a system configuration in an embodiment.

In the following, embodiments of the present disclosure are described based on the drawings. According to the embodiments, a device is provided that can prevent a user from being confused by presence of a large number of available programs. FIG. 1 is a diagram illustrating an example of a system configuration according to an embodiment. In FIG. 1, one or more image forming apparatuses 10 and a distribution server 20 are coupled through a network, such as a Local Area Network (LAN) or the Internet.

The image forming apparatus 10 is a multifunction apparatus provided with a single housing. The image forming apparatus 10 implements two or more functions of printing, scanning, copying, and facsimile transmission and reception. However, a device provided with any one of the functions may be used as the image forming apparatus 10. Furthermore, the image forming apparatus 10 according to the embodiment is an example of a device; and a device, such as a projector, a video conference system, or a digital camera, may be used instead of the image forming apparatus 10. In this case, the hardware configuration of the device may slightly differ from the hardware configuration of FIG. 2 depending on the device (e.g., a scanner 12 and a printer 13 included in the image forming apparatus 10 may not be required). It suffices if the device is provided with, in addition to configurations corresponding to an operations panel 15, a controller 11, and a network interface 16 illustrated in FIG. 2, a configuration specific to each device (e.g., if the device is a projector, a projection device including a projection lens; and if the device is a digital camera, an imaging device).

The distribution server 20 is one or more computers that distribute, to the image forming apparatus 10, an application program (which is referred to as an "application," hereinafter) requested by the image forming apparatus 10.

Figure 2:
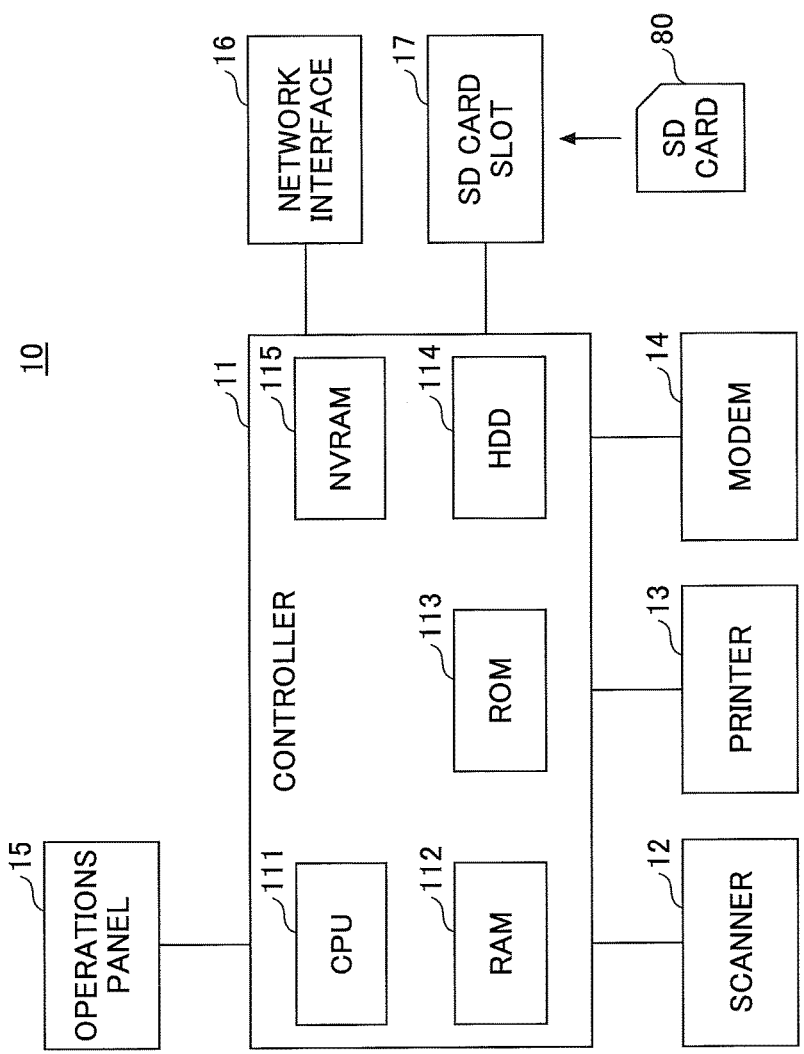
FIG. 2 is a diagram illustrating an example of a hardware configuration of an image forming apparatus according to the embodiment.

FIG. 2 is a diagram illustrating an example of a hardware configuration of the image forming apparatus 10 according to the embodiment. In FIG. 2, the image forming apparatus 10 is provided with hardware components, such as the controller 11, a scanner 12, a printer 13, a modem 14, the operations panel 15, the network interface 16, and a secure digital (SD) card slot 17.

The controller 11 is provided with a central processing unit (CPU) 111; a random-access memory (RAM) 112; a read-only memory (ROM) 113; a hard disk drive (HDD) 114; and a non-volatile random access memory (NVRAM) 115. The ROM 113 stores various types of programs and data items to be used by the programs. The RAM 112 is used as a storage area where programs are to be loaded, and as work areas for the loaded programs. The CPU 111 implements various types of functions by respectively processing programs loaded onto the RAM 112. The HDD 114 stores programs and various types of data items to be used by the programs. The NVRAM 115 stores various types of configuration information (setting information).

The scanner 12 is a hardware component (an image reader) for reading image data on a paper document. The printer 13 is a hardware component (a printing unit) for printing print data onto a print sheet. The modem 14 is a hardware component for establishing a connection to a telephone line. The modem 14 is used for executing transmission and reception of image data via facsimile communication. The operations panel 15 is a hardware component provided with an input unit (e.g., a button) for receiving an input from a user and a display (e.g., a liquid crystal panel). The liquid crystal panel may be provided with a touch panel function. In this case, the liquid crystal panel also functions as an input unit. The network interface 16 is a hardware component for establishing a connection to a network, such as a local area network (LAN), regardless of whether the network is a wired network or a wireless network. The SD card slot 17 is used for reading a program stored in a SD card 80. Namely, in the image forming apparatus 10, not only a program stored in the ROM 113, but also a program stored in the SD card 80 may be loaded into the RAM 112 to be executed. Note that the SD card 80 may be replaced with another recording medium (e.g., a compact disc read-only memory (CD-ROM) or a universal serial bus (USB) memory). Namely, types of the recording media equivalent to the SD card 80 are not limited to predetermined types. In this case, the SD card slot 17 may be replaced with a hardware component corresponding to the type of the recording medium.

Figure 3:
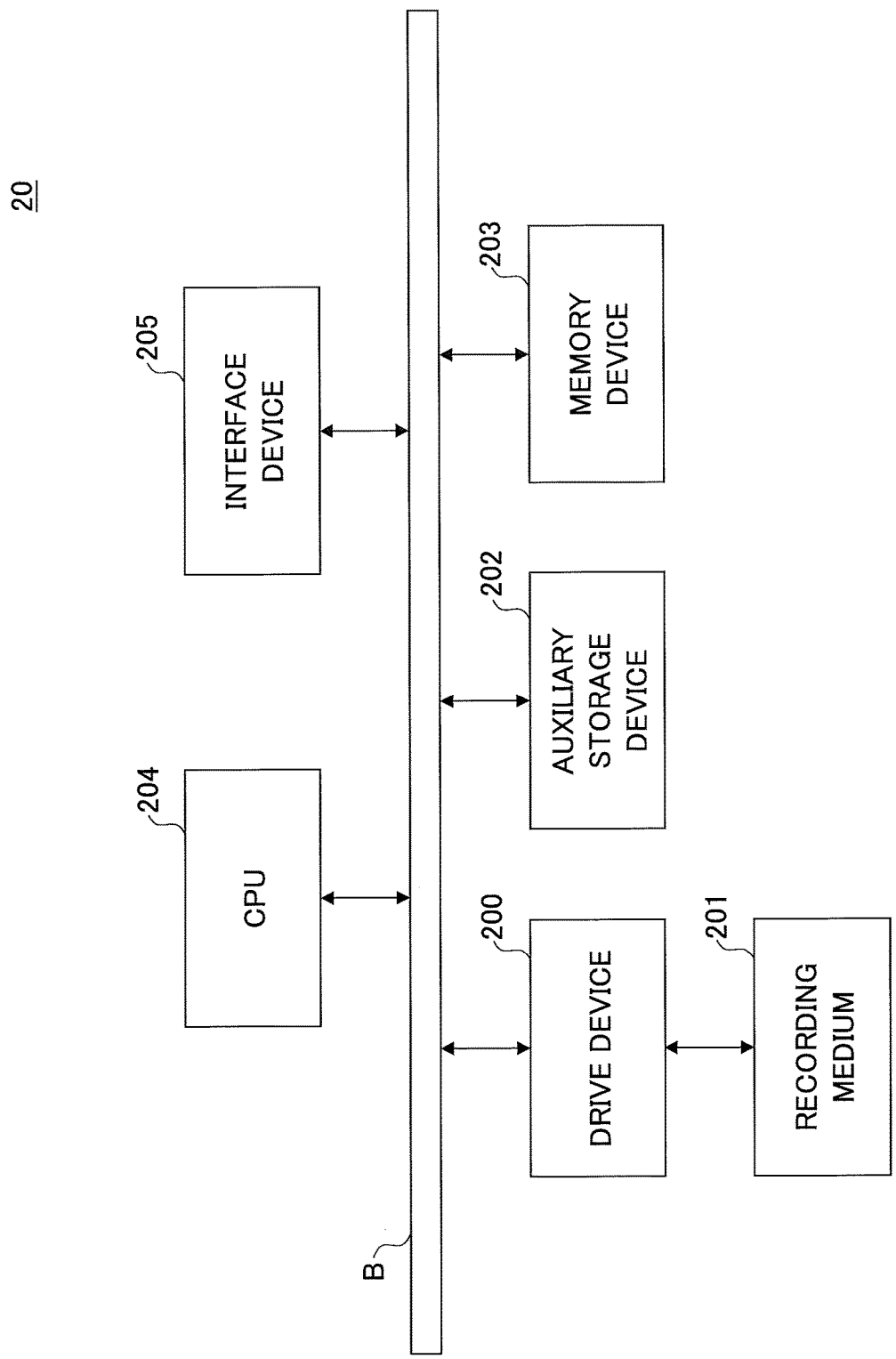
FIG. 3 is a diagram illustrating an example of a hardware configuration of a distribution server according to the embodiment.

FIG. 3 is a diagram illustrating an example of a hardware configuration of the distribution server 20 according to the embodiment. The distribution server 20 of FIG. 3 is provided with a drive device 200; an auxiliary storage device 202; a memory device 203; a CPU 204; and an interface device 205, which are mutually connected to via a bus B.

A program for implementing a process of the distribution server 20 may be provided using a recording medium 201, such as a CD-ROM. In response to detecting that the recording medium 201 storing a program is attached to the drive device 200, the program is read out from the recording medium 201 and is installed in the auxiliary storage device 202 through the drive device 200. However, installation of a program may be performed without using the recording medium 201. A program may be downloaded from another computer through a network. The auxiliary storage unit 202 stores an installed program together with necessary files and data items.

In response to detecting a command for activating a program, the memory device 203 reads out a program from the auxiliary storage device 202 and stores the program. The CPU 204 executes a function related to the distribution server 20 in accordance with a program stored in the memory device 203. The interface device 205 is used as an interface for connecting to a network.

Figure 4:
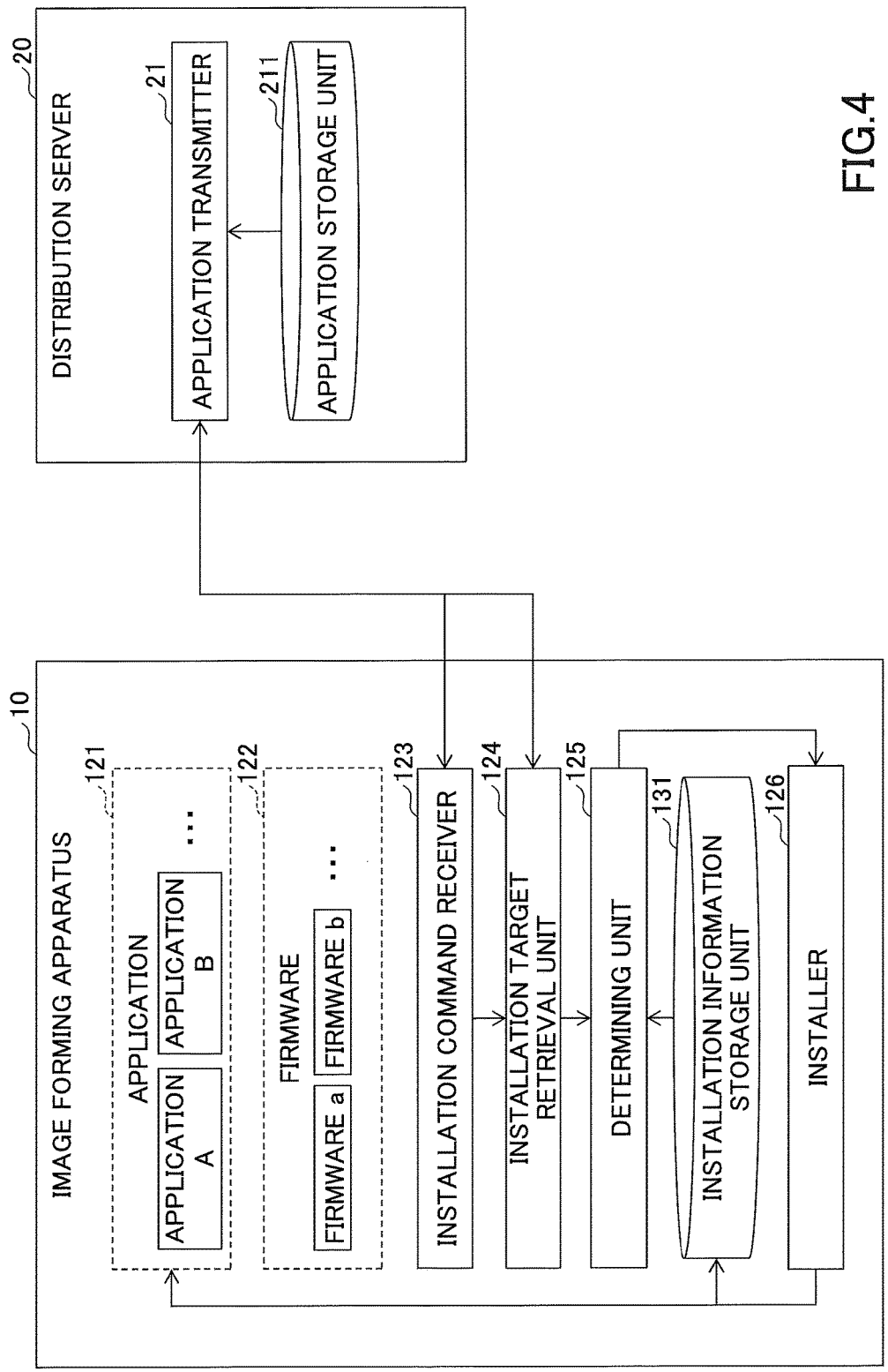
FIG. 4 is a diagram illustrating an example of functional configurations of respective devices in the embodiment.

FIG. 4 is a diagram illustrating an example of functional configurations of respective devices according to the embodiment. In FIG. 4, the image forming apparatus 10 is provided with, for example, various types of application 121, such as an application A and an application B; various types of firmware 122, such as firmware "a" and firmware "b"; an installation command receiver 123; an installation target retrieval unit 124; a determining unit 125; and an installer 126. Each of these components may be implemented by a process that is caused to be executed by the CPU 111 by one or more programs installed in the image forming apparatus 10. Furthermore, the image forming apparatus 10 uses an installation information storage unit 131. The installation information storage unit 131 may be implemented, for example, using the HDD 114 or a storage device that can be connected to the image forming apparatus 10 through a network.

The application 121 is a program for providing a function or a service requested by a user through a user interface, such as an operation screen.

The firmware 122 is a program provided with an application program interface (API) for using a function of the image forming apparatus 10 (e.g., a scanning function, a printing function, and a facsimile transmission/reception function).

The installation command receiver 123 receives an installation command for installing an application 121 from a user. The installation command specifies the application 121, which is an installation target. The installation target retrieval unit 124 retrieves (downloads), from the distribution server 20, data for installing the application 121 (which is referred to as "installation data," hereinafter), which is specified as the installation target.

The determining unit 125 determines as to whether the application 121 that is specified as the installation target is allowed to be installed by referring to the installation information storage unit 131. In the embodiment, for each class (which may include classification, the class is referred to as a "function type," hereinafter) of functions of the application 121 or the image forming apparatus 10, an upper limit number of installable applications 121 is defined. The determining unit 125 determines, for a function type to which the application 121 that is specified as the installation target belongs, whether installation of the application 121 that is the installation target is allowed by comparing a number of applications 121 that have already been installed in the image forming apparatus 10 with the upper limit number.

The installation information storage unit 131 stores, for each function type, identification information of one or more applications 121 that have already been installed and information indicating an upper limit number of installation.

The installer 126 executes an installation process for an application 121 that is an installation target. However, the installer 126 varies the installation process depending on a determination result by the determining unit 125. Specifically, upon detecting that installation of the application 121 that is the installation target is allowed, the installer 126 executes installation of the application 121. However, upon detecting that installation of the application 121 is disallowed, the installer 126 does not execute installation of the application 121.

The distribution server 20 is provided with an application transmitter 21. The application transmitter 21 is implemented by a process that is caused to be executed by the CPU 204 by one or more programs installed in the distribution server 20. Furthermore, the distribution server 20 uses an application storage unit 211. The application storage unit 211 may be implemented, for example, using the auxiliary storage device 202 or a storage device that can be connected to the distribution server 20 through a network.

The application transmitter 21 transmits, to the image forming apparatus 10, installation data related to a retrieval request from the image forming apparatus 10. The application storage unit 211 stores installation data for each application 121 that can be installed in the image forming apparatus 10.

Figure 5:
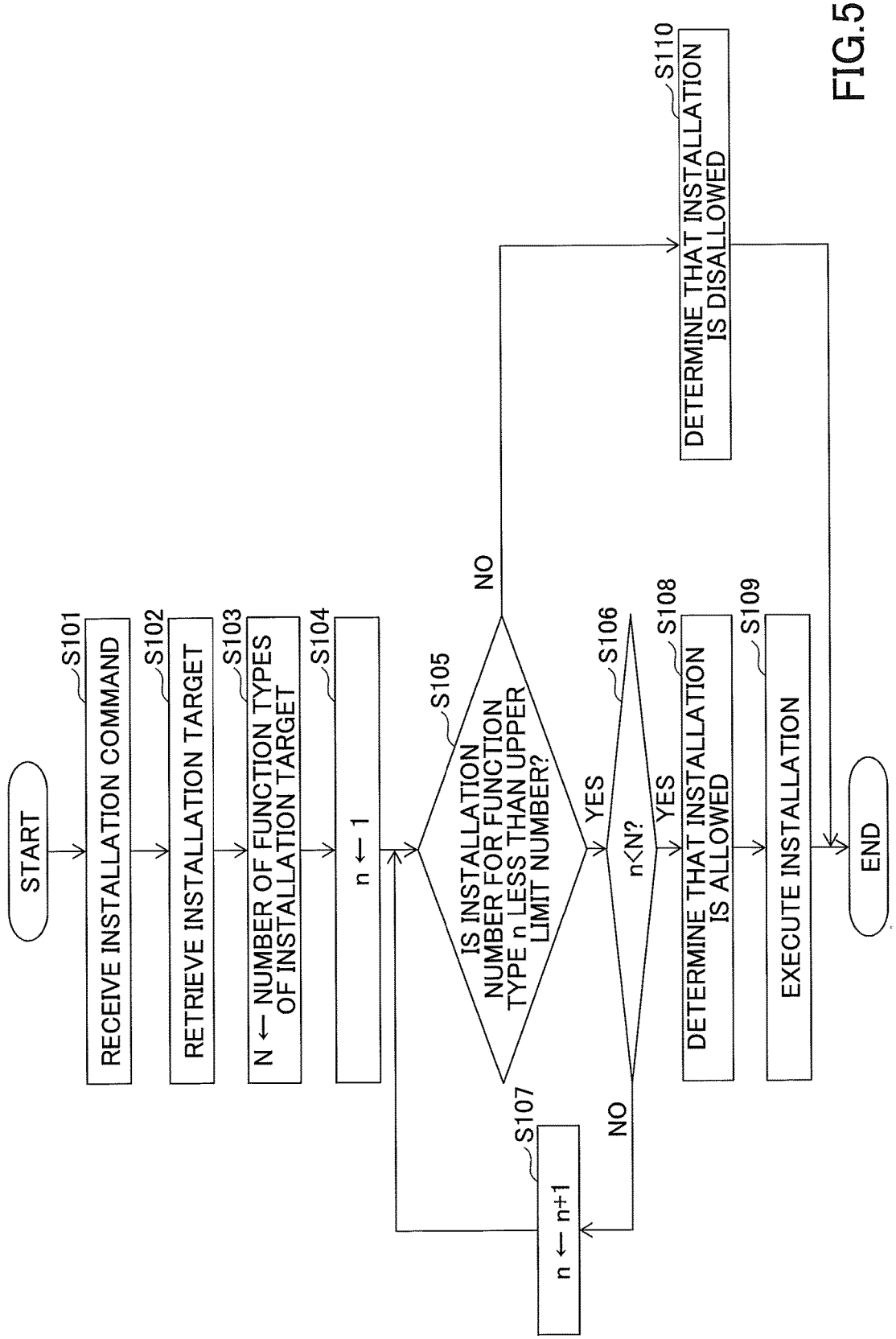
FIG. 5 is a flowchart illustrating an example of a procedure to be performed by the image forming apparatus according to the embodiment.

In the following, a procedure is described that is to be executed by the image forming apparatus 10 in the embodiment. FIG. 5 is a flowchart illustrating an example of the procedure to be executed by the image forming apparatus 10 in the embodiment. In FIG. 5, a user operates the image forming apparatus 10.

At step S101, the installation command receiver 123 receives an installation command for installing an application 121 from the user. In the installation command, identification information of the application 121 (which is referred to as "application ID," hereinafter) that is the installation target is specified. For example, the installation command receiver 123 may obtain list information of installable applications 121 from the distribution server 20; and the installation command receiver 123 may display, on the operations panel 15, resultant information obtained by removing information about applications 121 that have already been installed in the image forming apparatus 10 from the list information. An application 121 selected by the user from the displayed list information may be an installation target. In the following, an application 121 that is an installation target is referred to as a "target application," and an application ID of a target application is referred to as a "target application ID."

Subsequently, the installation target retrieval unit 124 retrieves installation data of the target application from the distribution server 20 (S102). For example, the installation target retrieval unit 124 transmits, to the distribution server 20, a retrieval request for retrieving the installation data including the target application ID. The application transmitter 21 of the distribution server 20 retrieves, from the application storage unit 211, installation data related to the target application ID included in the retrieval request; and the application transmitter 21 transmits the installation data to the installation target retrieval unit 124.

Figure 6:
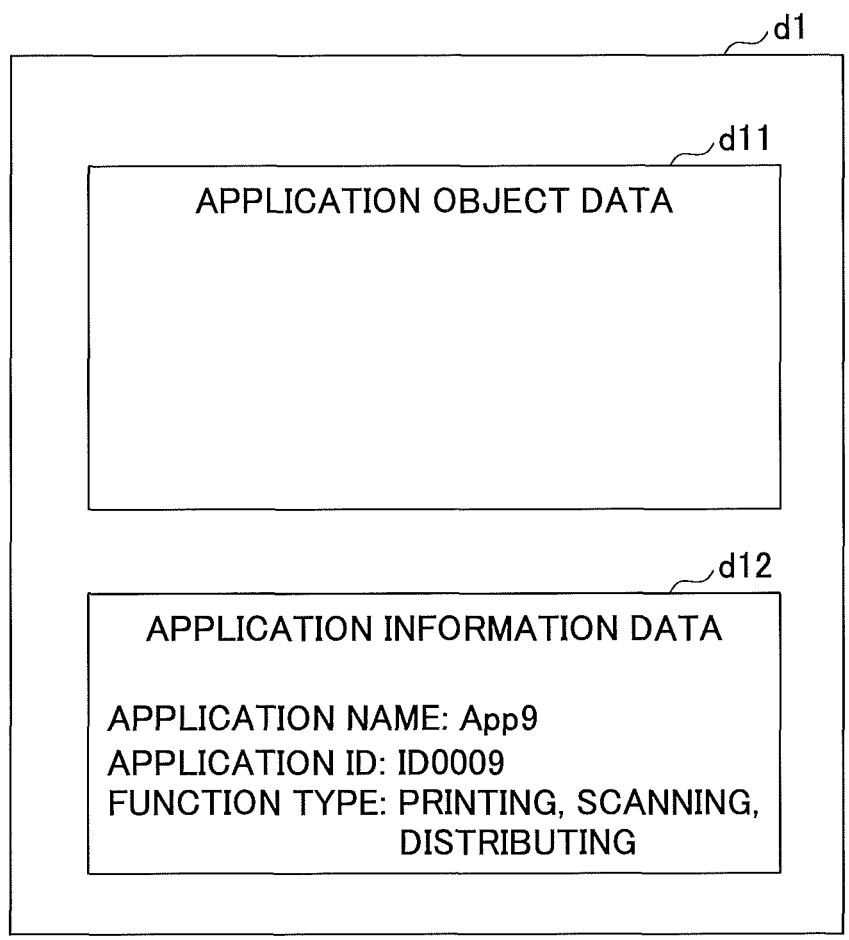
FIG. 6 is a diagram illustrating an example of a configuration of installation data.

FIG. 6 is a diagram illustrating an example of a configuration of the installation data. As illustrated in FIG. 6, the installation data dl includes application object data d11 and application information data d12.

The application object data d11 is an entity of the application 121, namely, a program part of the application 121. The application information data includes administrative information or attribute information of the application 121. In FIG. 6, the application information data includes an application name, an application ID, and a function type.

The application name is, for example, identification information of the application 121 presented to the user. The application ID is identification information for the image forming apparatus 10 and the distribution server 20 to identify each application 121. However, the image forming apparatus 10 and the distribution server 20 may identify each application 121 based on the application name. The function type represents a class (i.e., classification or a function type) to which the application 121 belongs. In FIG. 6, an example is illustrated where the target application belongs to three function types of "printing," "scanning," and "distributing." Namely, a single application 121 may belong to one or more function types. A function type to which an application 121 belongs may be a function type of a function used by the application 121, among functions provided by the image forming apparatus 10; or a function type of a function implemented by the application 121.

Subsequently, the determining unit 125 substitutes a function type number of the target application in a variable N (S103). A function type number of a target application is defined to be a number of function types to which the target application belongs. The function type number can be obtained by counting a number of function types the application information data of the target application. In the example of FIG. 6, the function type number of the target application is three.

Subsequently, the determining unit 125 substitutes 1 in a variable "n" (S104). A variable "n" indicates an order of a function type to be processed, among function types to which a target application belongs. In the following, the n-th function type is referred to as a "function type n." In the example of FIG. 6, the function type 1 is "printing."

Subsequently, the determining unit 125 determines, by referring to the installation information storage unit 131, whether an installation number of applications 121 in the image forming apparatus 10 with respect to a function type n is less than the upper limit number (S105).

FIG. 7 is a diagram illustrating an example of a configuration of the installation information storage unit 131. As illustrated in FIG. 7, the installation information storage unit 131 stores, for each function type, a function type name, an upper limit number, and an installation status.

The function type name is a name of a function type. The upper limit number is an upper limit value of an installation number of applications 121 belonging to the function type. The installation status is a list of application names of applications 121 that have already been installed in the image forming apparatus 10, among the applications 121 belonging to the function type. Accordingly, by counting the number of the application names in the installation status, the installation number with respect to the function type can be obtained. Note that, in FIG. 7, an example is illustrated where the application names of respective applications 121 are stored in the field of the installation status, for convenience. However, the application IDs may not be stored.

In the example of FIG. 7, an example is illustrated where the App1 belongs to the function types of scan, print, distribution, tracking, device address book referencing, and device address book writing. Additionally, the upper limit number with respect to the authentication is one, and the App8 is installed with respect to the authentication.

According to FIG. 7, for each of the facsimile transmission, the print, the distribution, the accumulation, and the device address book referencing, the installation number does not reach the upper limit number. In contrast, for each of the authentication, the scan, the facsimile reception, the tracking, the OCR, and the device address book writing, the installation number reaches the upper limit number.

Note that, in the installation information storage unit 131, the upper limit numbers and the installation status may differ depending on the image forming apparatus 10, or may be common among a plurality of image forming apparatuses 10. In the latter case, information about the plurality of image forming apparatuses 10 may be centrally managed by the distribution server 20, for example.

Upon detecting that the installation number with respect to the function type n is less than the upper limit number (YES at S105), the determining unit 125 determines whether "n" is less than "N" (S106). In other words, a determination is made as to whether, for all the function types to which the target application belongs, the installation number has been compared with the upper limit number.

In response to detecting that "n" is less than "N" (NO at S106), 1 is added to "n" (S107), and the process on and after step S105 is repeated. Namely, the process on and after step S105 is executed for the next function type, among the function types to which the target application belongs.

Upon detecting that the value of "n" is equal to the value of "N" (YES at S106), the determining unit 125 determines that the installation of the target application is allowed ("installation is allowed" at S108) (S108). Subsequently, the installer 126 installs the installation data of the target application in the image forming apparatus 10 (S109). Upon detecting that the installation is successful, the installer 126 updates contents of the installation information storage unit 131. Namely, the installer 126 stores, in the installation information storage unit 131, the application name of the target application while associating the application name with each function type to which the target application belongs.

Upon detecting, for any one of the function types n, that the installation number reaches the upper limit number (NO at S105), the determining unit 125 determines that installation of the target application is disallowed ("installation is disallowed" at S110) (S110). In this case, the installer 126 does not execute installation of the target application. Namely, when the application 121 belongs to a plurality of function types, if there exists a function type of the plurality of function types for which the installation number reaches the upper limit number, the installation is not allowed.

As described above, according to the embodiment, installation of the applications 121 on the image forming apparatus 10 can be restricted. As a result, it can be avoided to install a large number of applications for similar functions without a limit, so that a user can be prevented from being confused by existence of a large number of applications 121 that can be used.

Additionally, by avoiding installing a large number of applications 121, a frequency of occurrence of contention for using resources of the image forming apparatus 10 can be reduced.

Furthermore, likelihood of occurrence of inconsistency in the data can be reduced, which may be caused by a difference in specifications of a plurality of applications 121 that use the same data. For example, suppose that an application A and an application B are applications 121 for writing on an address book, respectively, and that a writing format of the application A differs from a writing format of the application B. In this case, if the address book is updated by the application A, the application B may not read the address book. In such a case, for example, by setting the upper limit number of applications 121 with respect to the device address book writing to one, occurrence of such a situation can be avoided.

Next, another embodiment is described. In this embodiment, points that are different from the above-described embodiment are described. Accordingly, points that are not specifically described may be the same as the above-described embodiment.

FIG. 8 is a flowchart illustrating an example of a procedure to be executed by the image forming apparatus 100 according to the embodiment. In FIG. 8, the same reference numerals are attached to steps that are the same as the steps in FIG. 5, and the descriptions of the steps are omitted.

In FIG. 8, the procedure after determining that installation is disallowed (namely the procedure after step S110) is different from the procedure of FIG. 5.

Subsequent to step S110, the installer 126 obtains, from the installation information storage device 131, a list of names of applications that have already been installed for a function type "n" (S111). Namely, an installation status for the function type "n" is obtained. Subsequently, the installer 126 causes the operations panel 15 to display the list of the obtained application names in a state in which each application name can be selected (S112). Based on the displayed list, a user can find which application 121 is to be uninstalled, so that the target application is allowed to be installed.

Subsequently, upon detecting that one of the application names is selected by the user (S113), the installer 126 uninstalls the application 121 corresponding to the application name from the image forming apparatus 10 (S114). Upon detecting that uninstallation is successfully executed, the installer 126 updates the contents of the installation information storage unit 131. Namely, the installer 126 deletes the application name of the uninstalled application 121, among the application names stored in the installation information storage unit 131. Here, each of the application names is stored in the installation information storage unit 131 while associated with the function types to which the corresponding application 121 belongs. Subsequently, the procedure on and after step S106 is continued.

As described above, according to this embodiment, the user can be notified of an application 121 that is the cause of the denial of the installation of the target application. Furthermore, the application 121 that is selected, among the notified applications 121, by the user can be automatically uninstalled, so that the operational burden on the use for installing the target application can be reduced.

Next, another embodiment is described. In this embodiment, points that are different from the above-described embodiment are described. Accordingly, points that are not specifically described may be the same as the above-described embodiment.

Figure 9:
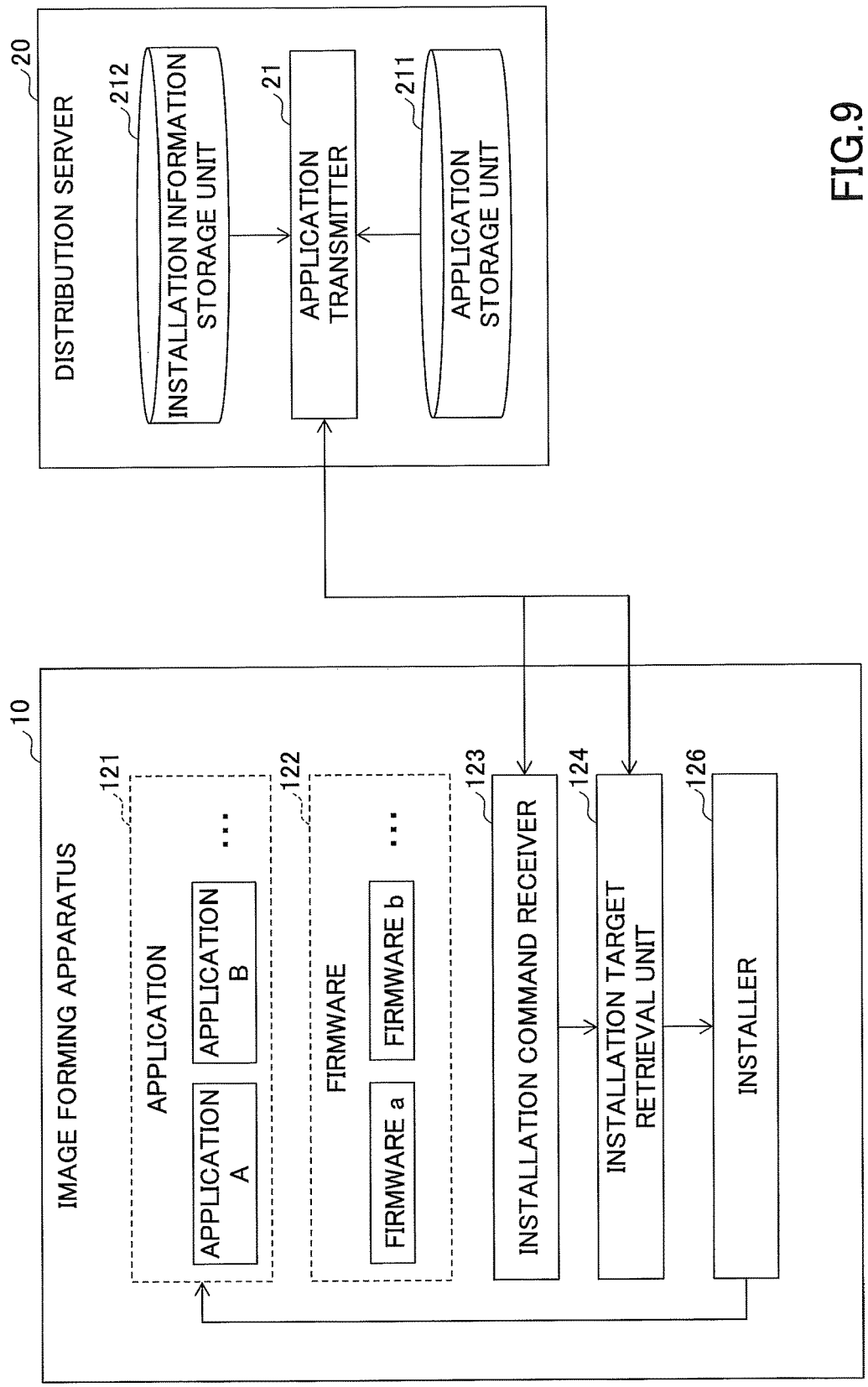
FIG. 9 is a diagram illustrating an example of functional configurations of respective devices according to another embodiment.

FIG. 9 is a diagram illustrating an example of functional configurations of respective devices according to the embodiment. In FIG. 9, the same numerical references are attached to the parts that are the same as the corresponding parts of FIG. 4, and the descriptions of the parts are omitted. In FIG. 9, the image forming apparatus 10 is not provided with the determining unit 125 and the installation information storage unit 131.

In contrast, the distribution server 20 utilizes an installation information storage unit 212. The installation information storage unit 212 is provided with a configuration that is the same as the installation information storage unit 131 of the above-described embodiments. However, the installation information storage unit 212 may store, for each image forming apparatus 10, the information that is stored in the installation information storage unit 131. For example, the information illustrated in FIG. 7 may be stored in the installation information storage unit 212 while being associated with the identification information (which is referred to as the "device ID," hereinafter) of the corresponding image forming apparatus 10.

Figure 10:
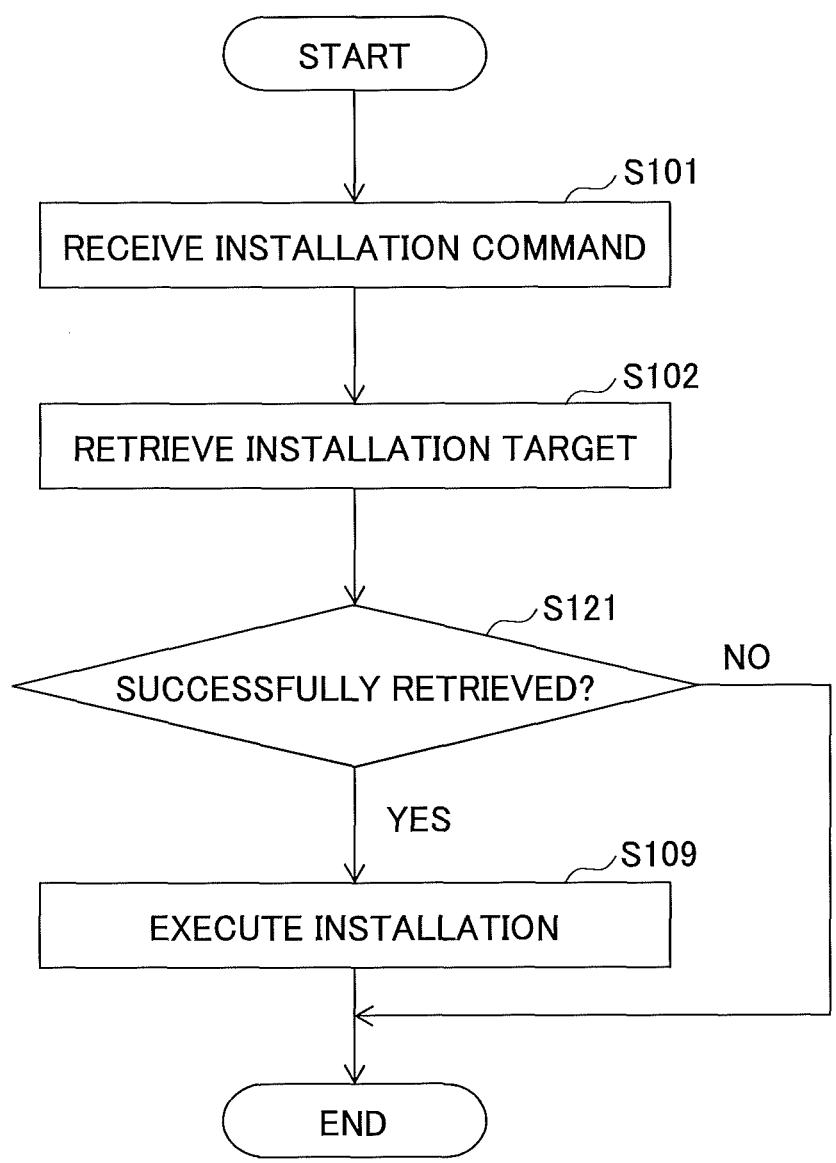
FIG. 10 is a flowchart illustrating an example of a procedure to be executed by the image forming apparatus according to the other embodiment.

FIG. 10 is a flowchart illustrating an example of a procedure to be executed by the image forming apparatus 100 according to the embodiment. In FIG. 10, the same reference numerals are attached to steps that are the same as the steps in FIG. 5, and the descriptions of the steps are omitted.

In this embodiment, upon detecting that the installation data is successfully obtained (YES at S121), the installer 126 executes installation of the target application. The case where the installation data is successfully obtained is the case where the installation data is transmitted from the distribution server 20.

Upon detecting a failure in obtaining the installation data (NO at S121), the installer 126 does not execute installation of the target application. The case where it is failed to obtain the installation data is the case where information indicating that installation is disallowed is transmitted from the distribution server 20.

Figure 11:
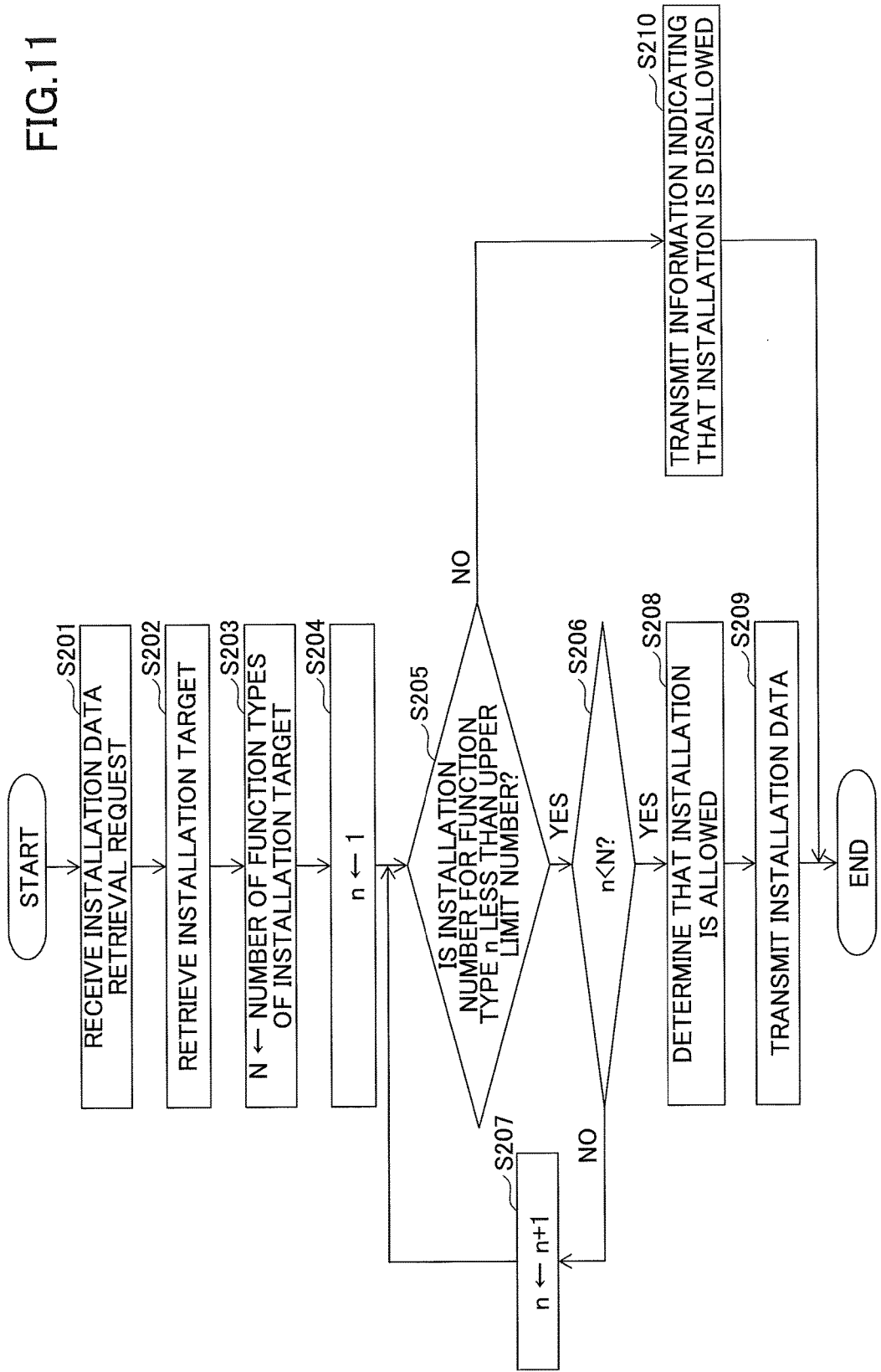
FIG. 11 is a flowchart illustrating an example of a procedure to be executed by the distribution server according to the other embodiment.

FIG. 11 is a flowchart illustrating an example of a procedure to be executed by the distribution server 20 according to the embodiment.

At step S201, the application transmitter 21 receives a retrieval request for the installation data. Subsequently, the application transmitter 21 retrieves, from the application storage unit 211, the installation data corresponding to the application ID included in the retrieval request (S202).

With respect to subsequent steps S203 through S208, the procedure that is the same as the procedure of steps S103 through S108 in FIG. 5 is executed by the application transmitter 21. However, when the information stored in the installation information storage unit 212 is separated for each image forming apparatus 10, the information corresponding to the device ID included in the retrieval request for the installation data is used.

Upon detecting that installation is allowed (S208), the application transmitter 21 transmits the installation data retrieved at step S202 to the image forming apparatus 10 that is the sender of the retrieval request for the installation data (S209).

However, upon detecting, for any function type n, that the installation number reaches the upper limit number (NO at S205), the application transmitter 21 transmits information indicating that installation of the target application is disallowed ("installation is disallowed") to the image forming apparatus 10 (S210).

As described above, a device outside the image forming apparatus 10 may determine as to whether installation of a target application is allowed.

Next, another embodiment is described. In this embodiment, points that are different from the above-described embodiments are described. Accordingly, points that are not specifically described may be the same as the above-described embodiments.

Figure 12:
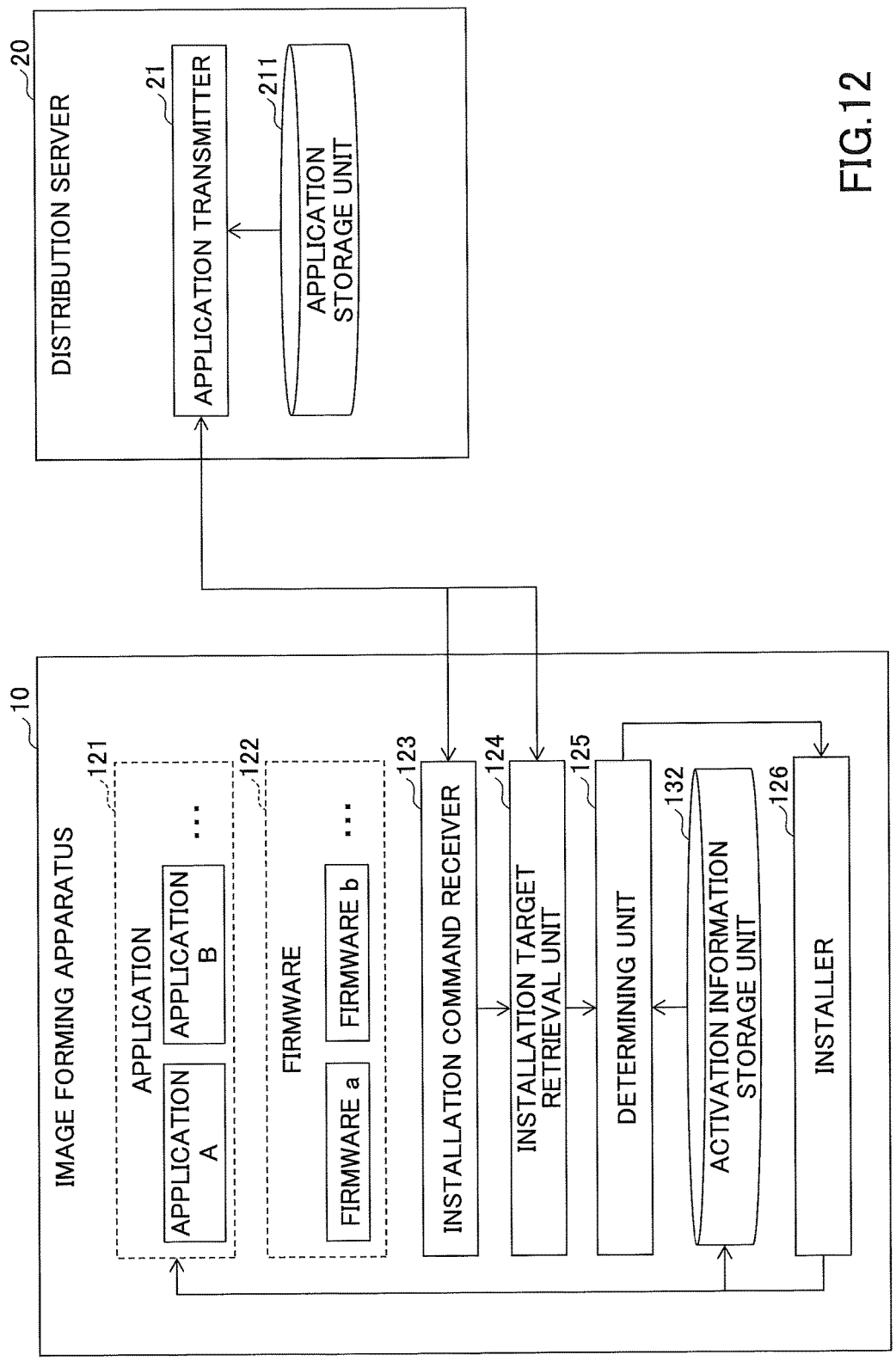
FIG. 12 is a diagram illustrating an example of functional configurations of respective devices according to another embodiment.

FIG. 12 is a diagram illustrating an example of configurations of respective devices in this embodiment. As described in FIG. 12, the image forming apparatus 10 utilizes an activation information storage unit 132. The activation information storage unit 132 may be implemented by using, for example, the HDD 114 or a storage device that can be connected to the image forming apparatus 10 through a network.

The activation information storage unit 132 stores, for each function type, identification information of an application 121 activated in the image forming apparatus 10 and information indicating an upper limit of an activation number.

FIG. 13 is a flowchart for illustrating an example of a procedure to be executed by the image forming apparatus 10 in the embodiment. In FIG. 13, the same step numbers are attached to steps that are the same as the corresponding steps in FIG. 8, and the descriptions of the steps are omitted as appropriate.

In FIG. 13, step S105 is replaced with step S105a. At step S105a, the determining unit 125 determines, by referring to the activation information storage unit 132, as to whether a number of applications 121 activated in the image forming apparatus 10 with respect to a function type n is less than the upper limit number.

FIG. 14 is a diagram illustrating an example of a configuration of the activation information storage unit 132. As illustrated in FIG. 14, the activation information storage unit 132 stores, for each function type, a function type name, an upper limit number, and an activation status. The meanings of the items other than the upper limit number and the activation status are as described in FIG. 7. The upper limit number is an upper limit value of a number of activated applications 121 belong to the function type. The activation status is a list of application names of currently activated applications 121 in the image forming apparatus 10, among applications 121 belonging to the function type. Accordingly, by counting the number of application names in the activation status, the activation number for the function type can be obtained.

Upon detecting that the activation number with respect to the function type n is less than the upper limit number (YES at S105), the determining unit 125 determines as to whether "n" is less than "N" (S106). Namely, a determination is made as to whether, for all the function types to which the target application belongs, the activation number is compared with the upper limit number.

Upon detecting that "n" is less than "N" (NO at S106), 1 is added to "n" (S107), and the process on and after step S105a is repeated. Namely, the process on and after step S105s is executed for the next function type, among the function types to which the target application belongs.

Upon detecting that the value of "n" is equal to the value of "N" (YES at S106), the determining unit 125 determines that the activation of the target application is allowed ("activation is allowed" at S108a) (S108a). Subsequently, the installer 126 installs the installation data of the target application in the image forming apparatus 10 (S109). Then, the installer 126 activates the target application (S115). Upon detecting that the activation is successful, the installer 126 updates contents of the activation information storage unit 132. Namely, the installer 126 stores, in the activation information storage unit 132, the application name of the target application while associating the application name with each function type to which the target application belongs.

However, upon detecting, for any one of the function types n, that the activation number reaches the upper limit number (NO at S105a), the determining unit 125 determines that activation of the target application is disallowed as it is ("activation is disallowed" at S110a) (S110a).

Subsequently, the installer 126 retrieves, from the activation information storage unit 132, a list of application names of applications 121 that have already been activated for the function type n (S111a). Namely, the content of the activation status for the function type n is obtained. Subsequently, the installer 126 causes the operations panel 15 to display the obtained list of the application names in a state in which each application name can be selected (S112a). Based on the displayed list, a user can find which application 121 is to be deactivated, so that the target application is allowed to be activated.

Subsequently, upon detecting that one of the application names is selected by the user (S113a), the installer 126 deactivates the application 121 corresponding to the application name (S114a). Upon detecting that deactivation is successfully executed, the installer 126 updates the contents of the activation information storage unit 132. Namely, the installer 126 deletes the application name of the deactivated application 121, among the application names stored in the activation information storage unit 132. Here, each of the application names is stored in the activation information storage unit 132 while associated with the function types to which the corresponding application 121 belongs. Subsequently, the procedure on and after step S106 is continued.

As described above, according to this embodiment, a number of activated applications 121 can be restricted. As a result, it can be avoided to activate a large number of applications 121 for similar functions, so that a user can be prevented from being confused by existence of a large number of applications 121 that can be used.

Additionally, as there is no upper limit for the installation number, an operation may be allowed such that installation of applications 121 is temporarily executed, and an unnecessary application 121 is uninstalled after using the respective applications 121.

Next, further embodiment is described. In this embodiment, points that are different from the above-described embodiment are described. Accordingly, points that are not specifically described may be the same as the above-described embodiment.

Figure 15:
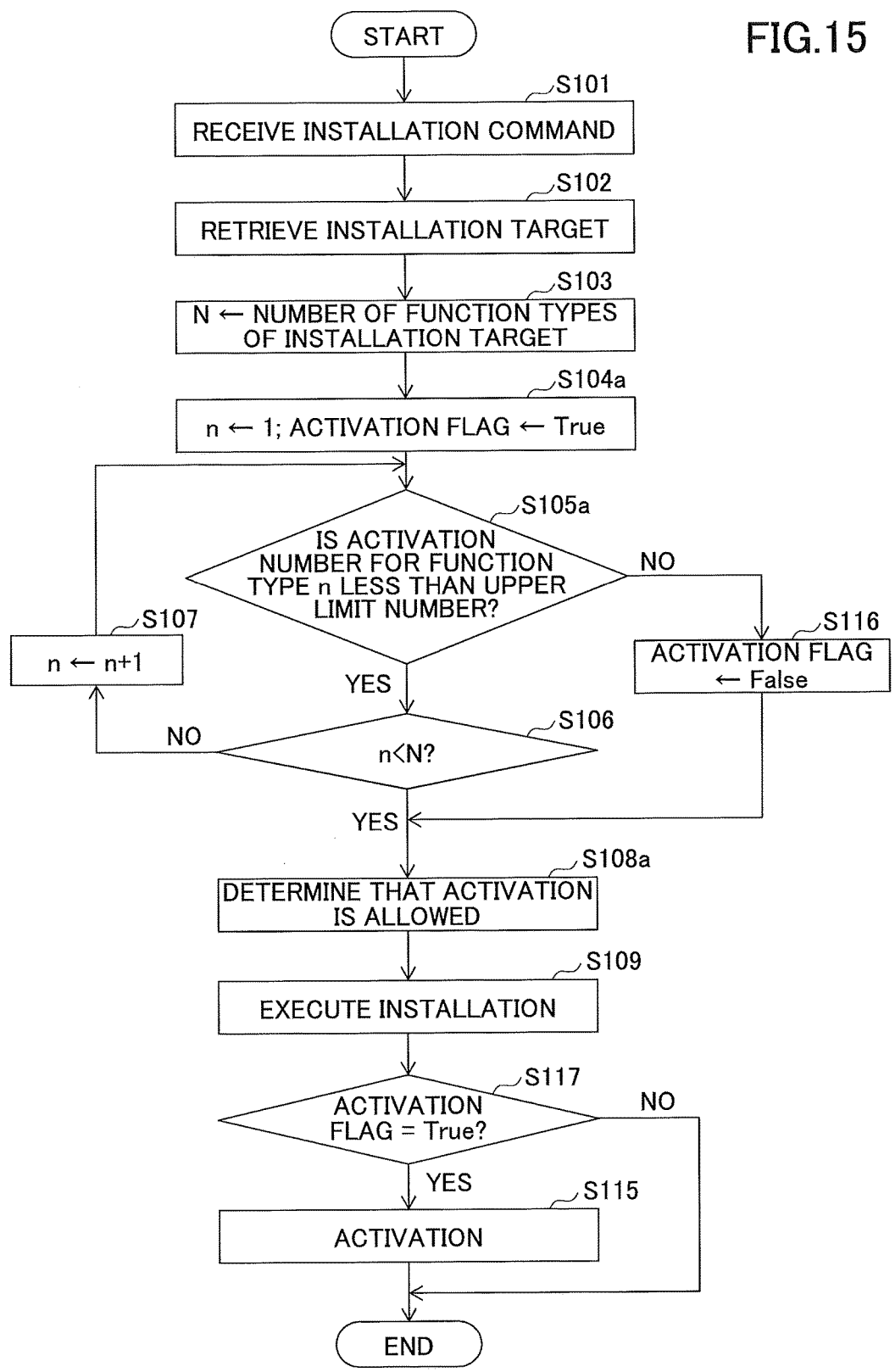
FIG. 15 is a flowchart illustrating an example of a procedure to be executed by the image forming apparatus according to a further embodiment.

FIG. 15 is a flowchart illustrating an example of a procedure to be executed by the image forming apparatus 100 according to the embodiment. In FIG. 15, the same step numbers are attached to steps that are the same as the steps in FIG. 13, and the descriptions of the steps are omitted.

In FIG. 15, step S104 is replaced with step S104a. At step S104a, the determining unit 125 further substitutes a value "True" in an activation flag. The activation flag is information indicating whether a target application is to be activated, and the activation flag can take one of values of "True" and "False." The value "True" indicates that a target application is to be activated. The value "False" indicates that a target application is not to be activated.

Furthermore, in FIG. 15, steps S110a through S114a in FIG. 13 are replaced with step S116. At step S116, the determining unit 125 substitutes the value "False" in the activation flag.

Furthermore, in FIG. 15, step S117 is executed prior to execution of step S115. At step S117, the installer 126 determines as to whether the value of the activation flag is "True." Upon detecting that the value of the activation flag is "True" (YES at S117), the installer 126 activates the target application (S115). Upon detecting that the value of the activation flag is "False" (NO at S117), the installer 126 does not activate the target application.

As described above, in this application, the effect that is the same as the effect of the above-described embodiment can be achieved.

In the above-described embodiments, installation of the applications 121 is described. However, the above-described embodiments may be applied to programs other than the applications 121, such as the firmware 122.

In the above-described embodiment, the image forming apparatus is an example of a device. The distribution server 20 is an example of an information processing device. The application transmitter 21 is an example of a receiver, a determining unit, and a transmitter. In some of the above-described embodiments, the applications 121 installed in the image forming apparatus 10 are examples of programs available in the device; and the upper limit number in the installation information storage unit 131 is an example of an upper limit number of the programs to be available. In some of the above-described embodiments, the applications 121 that are activated in the image forming apparatus 10 are examples of programs available in the device; and the upper limit number in the activation information storage unit 132 is an example of an upper limit number of the programs to be available.

The embodiments of the present invention are described above. However, the present invention is not limited to the specifically-described embodiments, and various variations and modifications may be made within the gist of the present invention described in the scope of claims.

It should be noted that a person skilled in the field of information processing technology may employ the present invention using application specific integrated circuits (ASIC) or an apparatus in which circuit modules are connected.

Further, each of the functions (units) may be implemented by one or more circuits.

It should be noted that, in this specification, the circuit may include a processor programmed by software to execute the corresponding functions and hardware which is designed to execute the corresponding functions such as the ASIC and the circuit module.

The present application is based on and claims the benefit of priority under 35 U.S.C. § 119 to Japanese priority application No. 2016-098571 filed on May 17, 2016 and Japanese priority application No. 2016-182082 filed on Sep. 16, 2016, the entire contents of which are hereby incorporated herein by reference in their entirety.

What is claimed is:

1. A device in which a plurality of programs is capable of being installed, wherein, for any program among the plurality of programs, a predetermined number of classes of functions are defined, the device comprising:
   a processor; and
   a memory that stores, for each of the predetermined number of classes, one or more identification information items of one or more programs belonging to the class that are currently available on the device and a maximum number of one or more programs belonging to the class that are available on the device,
   wherein the memory includes instructions, which when executed, cause the processor to execute the following steps:
   installing a specific program on the device; and
   determining, for a specific class of the predetermined number of classes to which the specific program to be installed belongs, whether a number of the one or more programs belonging to the specific class that are currently available on the device reaches the maximum number of the one or more programs belonging to the specific class that are available on the device, the maximum number being stored in the memory,
   wherein the step of installing varies a process related to installation of the specific program depending on a determination result by the step of determining.

2. The device according to claim 1, wherein the steps executed by the processor further include, upon detecting, for the specific class, that the number of the one or more programs belonging to the specific class that are currently available on the device reaches the maximum number of the one or more programs belonging to the specific class that are available on the device, terminating the installation of the specific program.

3. The device according to claim 1, wherein the steps executed by the processor further include, upon detecting, for the specific class, that the number of the one or more programs belonging to the specific class that are currently available on the device reaches the maximum number of the one or more programs belonging to the specific class that are available on the device, displaying, for the specific class, the one or more identification information items of the respective one or more programs belonging to the specific class that are installed on the device.

4. The device according to claim 3, wherein the steps executed by the processor further include, uninstalling a program corresponding to an identification information item that is selected from the one or more identification information items of the respective one or more programs belonging to the specific class that are installed on the device.

5. The device according to claim 3, wherein the steps executed by the processor further include, terminating execution of a program corresponding to an identification information item that is selected from the one or more identification information items of the respective one or more programs belonging to the specific class that are installed on the device.

6. The device according to claim 1, wherein the steps executed by the processor further include, upon detecting, for the specific class, that the number of the one or more programs belonging to the specific class that are currently available on the device reaches the maximum number of the one or more programs belonging to the specific class that are available on the device, installing the specific program, and suspending activation of the specific program.

7. An information processing method for use in a device in which a plurality of programs is capable of being installed, wherein, for any program among the plurality of programs, a predetermined number of classes of functions are defined, and wherein the device includes a storage unit for storing, for each of the predetermined number of classes, one or more identification information items of one or more programs belonging to the class that are currently available on the device and a maximum number of one or more programs belonging to the class that are available on the device, the method comprising:

installing a specific program on the device;

determining, for a specific class of the predetermined number of classes to which the specific program to be installed belongs, whether a number of the one or more programs belonging to the specific class that are currently available on the device reaches the maximum number of the one or more programs belonging to the specific class that are available on the device, the maximum number being stored in the storage unit; and varying a process related to installation of the specific program depending on a determination result by the determining.

8. The method according to claim 7, wherein, upon detecting, for the specific class, that the number of the one or more programs belonging to the specific class that are currently available on the device reaches the maximum number of the one or more programs belonging to the specific class that are available on the device, the installing terminates the installation of the specific program.

9. The method according to claim 7, wherein, upon detecting, for the specific class, that the number of the one or more programs belonging to the specific class that are currently available on the device reaches the maximum number of the one or more programs belonging to the specific class that are available on the device, the installing displays, for the specific class, the one or more identification information items of the respective one or more programs belonging to the specific class that are installed on the device.

10. The method according to claim 9, wherein the installing uninstalls a program corresponding to an identification information item that is selected from the one or more identification information items of the respective one or more programs belonging to the specific class that are installed on the device.

11. The method according to claim 9, wherein the installing terminates execution of a program corresponding to an identification information item that is selected from the one or more identification information items of the respective one or more programs belonging to the specific class that are installed on the device.

12. The method according to claim 7, wherein, upon detecting, for the specific class, that the number of the one or more programs belonging to the specific class that are currently available on the device reaches the maximum number of the one or more programs belonging to the specific class that are available on the device, the installing installs the specific program, and the installing suspends activation of the specific program.

13. A non-transitory computer program product for being executed on a computer in which a plurality of programs is capable of being installed, wherein, for any program among the plurality of programs, a predetermined number of classes of functions are defined, and wherein the computer includes a storage unit for storing, for each of the predetermined number of classes, one or more identification information items of one or more programs belonging to the class that are currently available on the computer and a maximum number of one or more programs belonging to the class that are available on the computer, the non-transitory computer program product comprising:

computer readable program means for causing the computer to install a specific program on the computer;

determine, for a specific class of the predetermined number of classes to which the specific program to be installed belongs, whether a number of the one or more programs belonging to the specific class that are currently available on the computer reaches the maximum number of the one or more programs belonging to the specific class that are available on the computer, the maximum number being stored in the storage unit; and vary a process related to installation of the specific program depending on a determination result by the determine.

14. The non-transitory computer program product according to claim 13, wherein the computer readable program means further causes the computer to, upon detecting, for the specific class, that the number of the one or more programs belonging to the specific class that are currently available on the computer reaches the maximum number of the one or more programs belonging to the specific class that are available on the computer, terminate the installation of the specific program.

15. The non-transitory computer program product according to claim 13, wherein the computer readable program means further causes the computer to, upon detecting, for the specific class, that the number of the one or more programs belonging to the specific class that are currently available on the computer reaches the maximum number of the one or more programs belonging to the specific class that are available on the computer, display, for the specific class, the one or more identification information items of the respective one or more programs belonging to the specific class that are installed on the computer.

16. The non-transitory computer program product according to claim 15, wherein the computer readable program means further causes the computer to uninstall a program corresponding to an identification information item that is selected from the one or more identification information items of the respective one or more programs belonging to the specific class that are installed on the computer.

17. The non-transitory computer program product according to claim 15, wherein the computer readable program means further causes the computer to terminate execution of a program corresponding to an identification information item that is selected from the one or more identification information items of the respective one or more programs belonging to the specific class that are installed on the computer.

18. The non-transitory computer program product according to claim 13, wherein the computer readable program means further causes the computer to, upon detecting, for the specific class, that the number of the one or more programs belonging to the specific class that are currently available on the computer reaches the maximum number of the one or more programs belonging to the specific class that are available on the computer, install the specific program, and suspend activation of the specific program.

* * * * *